United States Patent
Landis et al.

(10) Patent No.: US 10,344,894 B2
(45) Date of Patent: Jul. 9, 2019

(54) RETENTION AND ANTI-ROTATION FOR BULKHEAD FITTINGS

(71) Applicant: Parker-Hannifin Corporation, Cleveland, OH (US)

(72) Inventors: Phillip A. Landis, Hilliard, OH (US); Nathan Lynn Green, Columbus, OH (US); Burleigh George Bailey, Hilliard, OH (US); Theodore Thomas Amling, Upper Arlington, OH (US); Le Yu, Dublin, OH (US); Jose Pagan, Dublin, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 1148 days.

(21) Appl. No.: 14/496,531

(22) Filed: Sep. 25, 2014

(65) Prior Publication Data

US 2015/0091296 A1    Apr. 2, 2015

Related U.S. Application Data

(60) Provisional application No. 61/885,584, filed on Oct. 2, 2013.

(51) Int. Cl.
*F16L 5/12* (2006.01)
*F16L 5/02* (2006.01)
*H02G 3/22* (2006.01)
*F16B 33/00* (2006.01)

(52) U.S. Cl.
CPC .................. *F16L 5/12* (2013.01); *F16L 5/02* (2013.01); *F16B 33/002* (2013.01); *H02G 3/22* (2013.01)

(58) Field of Classification Search
CPC ... F16L 5/12; F16L 5/02; F16B 33/002; F16B 4/004; F16B 17/00; F16B 35/048; H02G 3/12
USPC ........ 285/194, 189, 192, 206, 208; 403/280, 403/282, 285; 411/424, 399
See application file for complete search history.

(56) References Cited

U.S. PATENT DOCUMENTS

| | | | | |
|---|---|---|---|---|
| 782,571 | A * | 2/1905 | Lang | E01B 11/10 238/185 |
| 1,556,241 | A * | 10/1925 | Mueller | E03C 1/0401 137/360 |
| 2,566,502 | A * | 9/1951 | Smith | F16L 41/04 137/15.12 |
| 3,047,036 | A | 7/1962 | Waltermire | |

(Continued)

FOREIGN PATENT DOCUMENTS

WO    2012/148793    11/2012
WO    2012/177344    12/2012

*Primary Examiner* — Anna M Momper
*Assistant Examiner* — Fannie C Kee
(74) *Attorney, Agent, or Firm* — Renner, Otto, Boisselle & Sklar, LLP

(57) ABSTRACT

A bulkhead fitting has a partially assembled configuration and a fully assembled configuration on a bulkhead. The bulkhead includes an interior surface that define a hole. The bulkhead fitting includes a fitting body having a head portion and a shank portion. The shank portion includes a threaded portion, a relief portion, and a locking portion. The locking portion includes a tapered locking surface and a cylindrical locking surface. The locking surfaces prevent rotation of the fitting body and retain the fitting body in the interior surface when the fitting is in its fully assembled position and during assembly.

19 Claims, 6 Drawing Sheets

(56) References Cited

U.S. PATENT DOCUMENTS

| | | | | |
|---|---|---|---|---|
| 3,117,486 A | * | 1/1964 | Matthews | F16B 37/122 |
| | | | | 411/178 |
| 3,252,495 A | | 5/1966 | Waltermire | |
| 3,984,132 A | | 10/1976 | Sarson | |
| 4,077,299 A | * | 3/1978 | King, Jr. | B23P 9/025 |
| | | | | 29/238 |
| 4,662,806 A | * | 5/1987 | Reed | B23P 6/04 |
| | | | | 206/231 |
| 4,687,235 A | * | 8/1987 | Stoll | F16L 27/0816 |
| | | | | 285/136.1 |
| 5,188,398 A | * | 2/1993 | Parimore, Jr. | F16L 19/005 |
| | | | | 285/330 |
| 5,209,622 A | * | 5/1993 | Kazino | F16B 35/047 |
| | | | | 411/386 |
| 5,215,336 A | * | 6/1993 | Worthing | F16L 19/005 |
| | | | | 285/319 |
| 5,316,041 A | * | 5/1994 | Ramacier, Jr. | F16L 37/0841 |
| | | | | 137/614.04 |
| 5,348,349 A | * | 9/1994 | Sloane | F16L 19/005 |
| | | | | 285/86 |
| 6,261,039 B1 | * | 7/2001 | Reed | B23P 6/04 |
| | | | | 411/178 |
| 6,883,836 B2 | | 4/2005 | Breay et al. | |
| 6,898,822 B2 | | 5/2005 | Nordquist et al. | |
| 7,681,923 B2 | | 3/2010 | Negley et al. | |
| 7,976,258 B2 | * | 7/2011 | Asai | C23C 28/023 |
| | | | | 411/424 |
| 2003/0068212 A1 | * | 4/2003 | Wilson | F16B 37/14 |
| | | | | 411/429 |

\* cited by examiner

RETENTION AND ANTI-ROTATION FOR BULKHEAD FITTINGS

RELATED APPLICATIONS

This application claims the benefit of U.S. Provisional Application No. 61/885,584 filed Oct. 2, 2013, which is hereby incorporated herein by reference.

FIELD OF INVENTION

This invention relates to a bulkhead fitting. More specifically, this invention relates to a bulkhead fitting with increased torque required to loosen or rotate the bulkhead fitting after assembly of the bulkhead fitting into a hole in a bulkhead.

BACKGROUND

The term bulkhead as used herein means a wall or partition or supporting structure. The term bulkhead fitting as used herein means a component that is secured into a hole in a bulkhead. In general, the purpose of a bulkhead fitting is to provide a connector that is attached to and/or through a bulkhead. The connector can, for example, be a fluid connector or an electrical connector or other connector. In the case of fluid connector bulkhead fittings, the bulkhead fitting may provide a path for fluid to flow through the bulkhead without leakage.

For bulkhead fittings of these types, it is desired that the bulkhead fitting not unintentionally rotate or loosen during assembly or in use. Rotation or loosening may result, for example, from excessive vibration or excessive external force or torque in some situations. Further, it is desired that the bulkhead fitting not require undesirably high assembly torques for assembling the fitting into the bulkhead. Further, it is desired that the bulkhead fitting not include relatively high additional complexity or cost and not introduce reliability issues.

These technical problems may be further explained, for example, with reference to a fluid connector bulkhead fitting. In general, this type of bulkhead fitting may include a fitting body that extends through a hole in the bulkhead and an internal passage that extends through the body. A fluid conduit such as a tube may be connected to each of the opposite ends of the fluid connector bulkhead fitting. Fluid flows through one of the conduits and then through the passage in the bulkhead fitting body and then through the other conduit, to flow the fluid through the bulkhead without leakage. Fluid connector bulkhead fittings of this type may include a head such as a hexagonal wrench receiving head on one side of the bulkhead and a threaded nut on the other side of the bulkhead. The fluid connector bulkhead fitting body may be assembled into the hole in the bulkhead. The head may engage one side of the bulkhead, and the nut may be tightened on the body against the opposite side of the bulkhead with a fitting assembly torque to secure the body to the bulkhead.

After assembly of the body into the bulkhead in this manner, it may be possible for the body or nut to rotate relative to the bulkhead. For example, the conduits may be secured to the opposite ends of the fitting body after assembly of the fitting body into the bulkhead. When this is done, excessive conduit assembly rotational torque may be applied to the fitting body. If this excessive rotational torque on the fitting body substantially exceeds the fitting assembly torque, the bulkhead fitting body may tend to rotate and loosen. Further, after assembly of the fitting body into the bulkhead in this manner, the bulkhead and the bulkhead fitting may be exposed to excessive vibration in use that may tend to rotate and loosen the nut relative to the body or the body relative to the nut.

SUMMARY OF INVENTION

The present invention in at least one embodiment addresses these and other technical problems and provides a bulkhead fitting in which breakaway torque required to rotate the fitting body relative to the bulkhead after assembly of the fitting body and nut is significantly greater than the body and nut assembly torque. Further, the present invention in at least one embodiment addresses these and other technical problems and provides a bulkhead fitting in which the body may remain attached to the bulkhead after assembly, even if the nut loosens during use. Further, the present invention in at least one embodiment provides a bulkhead fitting in which the body may resist rotation during tightening of the nut during assembly.

More specifically, at least one embodiment of the invention may provide a bulkhead fitting having a longitudinally extending fitting body disposed along a longitudinal axis. The fitting body may have a head portion for engaging a bulkhead side wall and a shank portion extending longitudinally from the head portion for being received into an opening in the bulkhead. The shank portion may have a threaded portion with an outside thread crest diameter of substantially smaller lateral extent than the head portion. A bulkhead locking portion may be disposed substantially adjacent the head portion, and the bulkhead locking portion may be intermediate the head portion and the threaded portion for locking the fitting body to a bulkhead. The bulkhead locking portion may have a tapered locking surface extending between a minimum size locking end and a maximum size locking end. The minimum size locking end may be intermediate the threaded portion and the maximum size locking end, and the minimum size locking end may have a lateral extent no larger than the outside thread crest diameter of the threaded portion. The maximum size locking end may have a lateral extent substantially larger than the outside crest diameter of the threaded portion.

At least one embodiment of the invention may provide the minimum size locking end and the maximum size locking end as generally cylindrical and may provide the head portion as including a wrench receiving outer surface. The bulkhead locking portion may include a generally cylindrical locking surface intermediate the tapered locking surface and the head portion. The generally cylindrical locking surface may include serrations, and the tapered locking surface may include serrations. The serrations of the tapered locking surface may extend continuously onto the cylindrical locking surface. The serrations on the cylindrical locking surface may terminate at a distance longitudinally spaced form the head portion, so that the distance provides a generally smooth cylindrical locking surface.

At least one embodiment of the invention may provide the head portion and the shank portion and the bulkhead locking portions as an integral one piece construction.

At least one embodiment of the invention may provide the bulkhead locking portions disposed on a ring carried by the shank portion intermediate the threaded portion and the head portion.

At least one embodiment of the invention may provide in combination a bulkhead and a bulkhead fitting and a fitting nut. The bulkhead may include oppositely facing side walls and a generally cylindrical interior surface defining a hole extending through the bulkhead between the side walls, with the interior surface having a hole diameter. The bulkhead fitting may include a bulkhead fitting body having a wrench receiving head portion and a shank portion extending longitudinally from the head portion through the hole from one side wall to the other side wall. The shank portion may have an external threaded portion with a thread crest outside diameter substantially smaller than the lateral extent of the head portion. The nut may be threadably connected to the external threaded portion of the shank portion and may engage the other side wall of the bulkhead. The shank portion may have a bulkhead locking portion, and the bulkhead locking portion may be intermediate the head portion and the threaded portion for locking the fitting body to the bulkhead. The bulkhead locking portion may have a tapered locking surface, the tapered locking surface may extend between a minimum diameter locking end and a maximum diameter locking end. The minimum diameter locking end may be intermediate the maximum diameter locking end and the threaded portion, and the diameter of the minimum diameter locking end may be substantially less than the hole diameter. The diameter of the maximum diameter locking end may be substantially greater than the hole diameter, and the fitting body portion may have a partially assembled configuration and a fully assembled configuration. The tapered locking surface may be located intermediate the minimum diameter locking end and the maximum diameter locking end and may engage the bulkhead at the intersection of the one side wall and the interior cylindrical surface when the fitting body portion is in its partially assembled configuration. The head portion may be spaced from the one side wall of the bulkhead when the fitting body portion is in its partially assembled configuration. The maximum diameter locking end may engage the bulkhead when the fitting body is in its fully assembled configuration. At least one of the tapered locking surface and the bulkhead interior surface may be deformed by the other when the fitting body is in its fully assembled configuration, and the head portion may engage the one side wall when the fitting body is in its fully assembled configuration.

In at least one embodiment of the invention, the longitudinal extent of the bulkhead is substantially greater than the combined longitudinal extent of the cylindrical surface and conical surface, so that substantially the entire longitudinal extent of the cylindrical surface and conical surface is locked to the bulkhead interior surface. The tapered locking surface may extend at an angle of between about 5 degrees and about 45 degrees relative to the longitudinal axis.

This Summary is not intended to identify all key features or essential features of the claimed subject matter, and these and other features of the invention are more fully described and particularly pointed out in the description and claims set out below. The following description and claims and the annexed drawings set forth in detail certain illustrative embodiments of the invention, and these embodiments indicate but a few of the various ways in which the principles of the invention may be used.

BRIEF DESCRIPTION OF THE DRAWINGS

Embodiments of this invention will now be described in further detail with reference to the accompanying drawings, in which.

DETAILED DESCRIPTION

Figure 1:
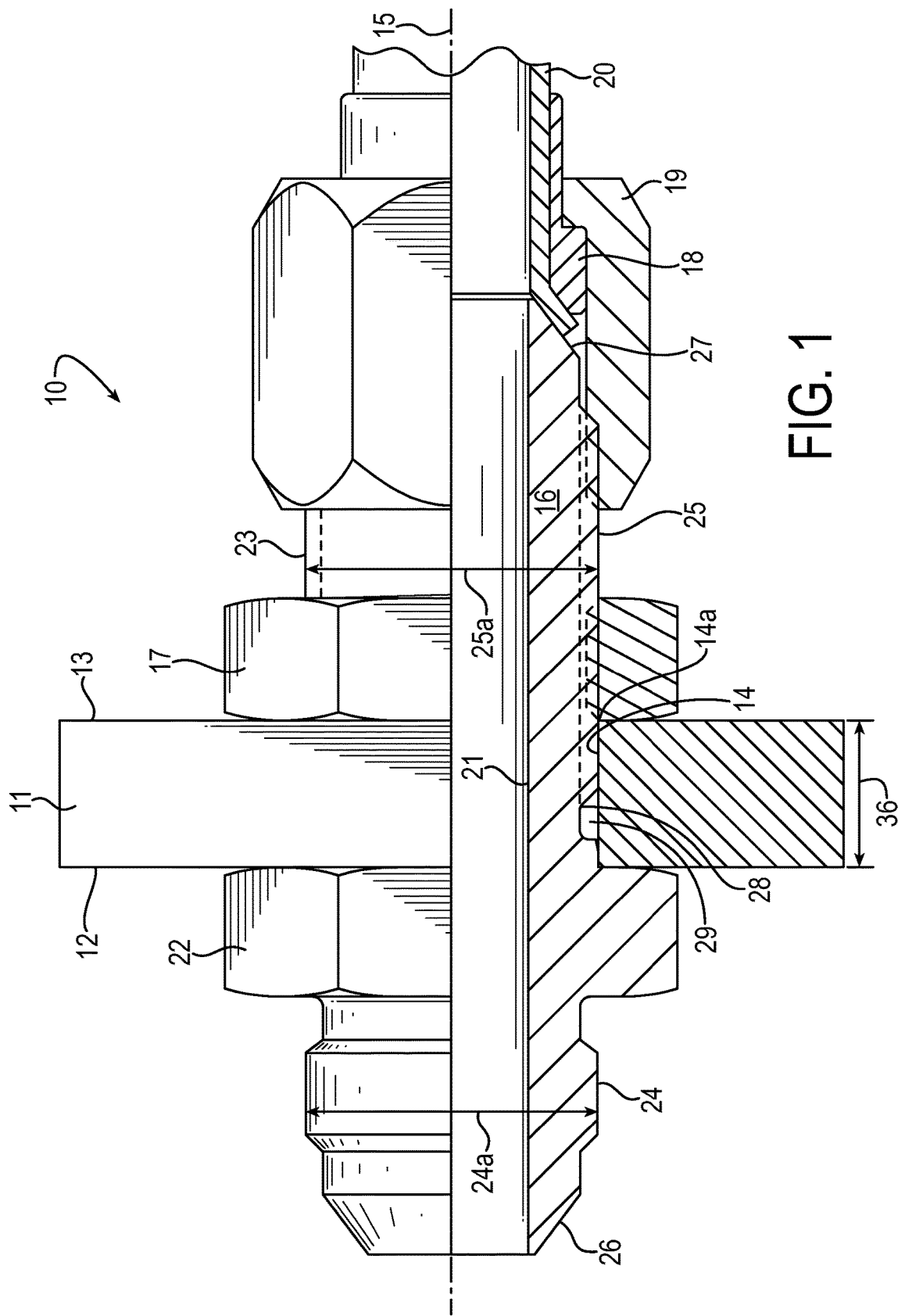
FIG. 1 illustrates a bulkhead and a bulkhead fitting according to a preferred embodiment of the invention, showing the top half in elevation and the bottom half in cross section, and showing the bulkhead fitting in a fully assembled configuration.
Figure 2:
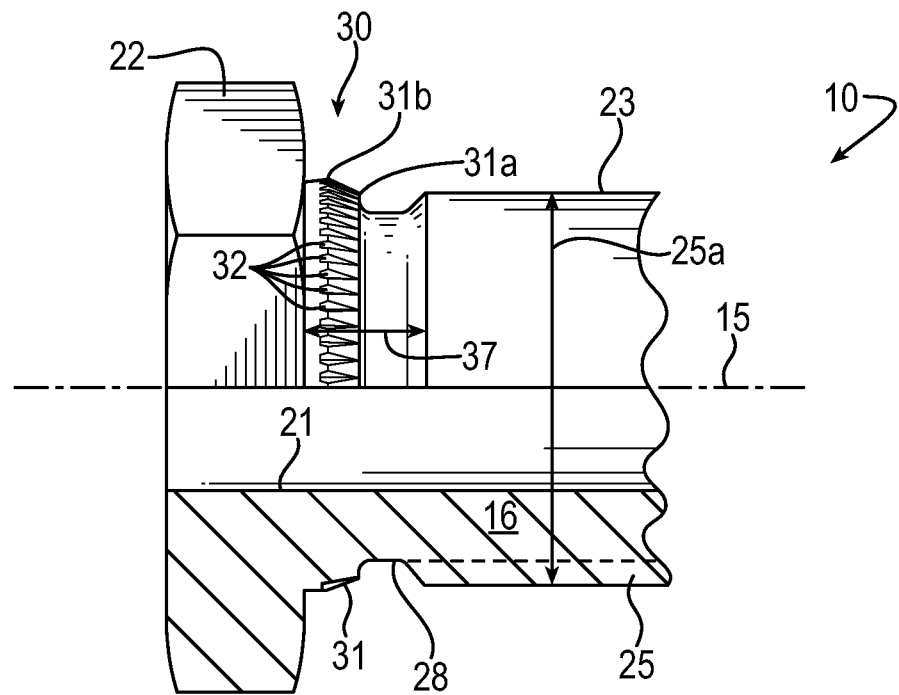
FIG. 2 illustrates a portion of the bulkhead fitting of FIG. 1, without the bulkhead.
Figure 3:
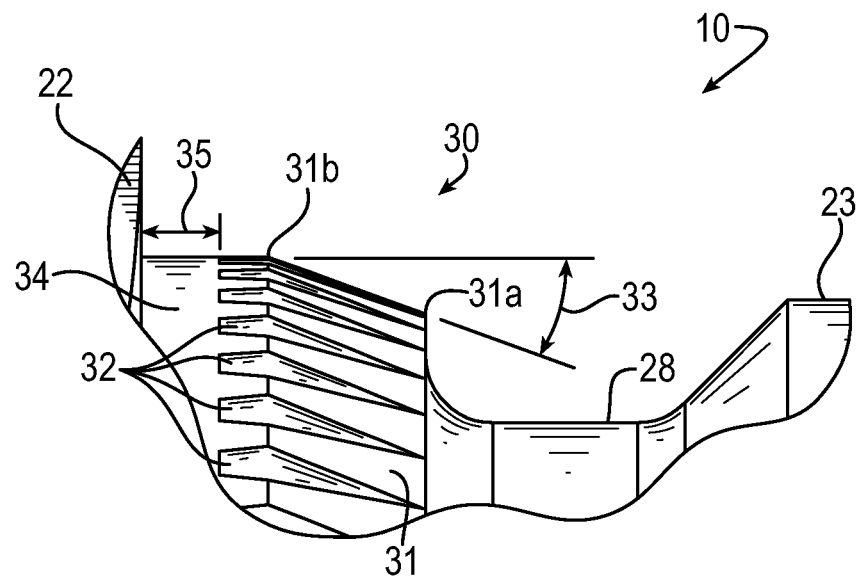
FIG. 3 is an enlarged view of a portion of the bulkhead fitting shown in FIGS. 1 and 2.

Referring now to the drawings in greater detail, FIGS. 1-3 illustrate a preferred embodiment of a bulkhead fitting 10 according to the present invention assembled into a bulkhead 11. While the invention is applicable to various types of bulkhead fittings described above, the bulkhead fitting 10 according to the preferred embodiment is a fluid connector bulkhead fitting that provides a sealed fluid flow path through the bulkhead 11. The bulkhead 11 may be of any desired metallic or non-metallic material, and in the preferred embodiment the bulkhead 11 is of a suitable steel material. The bulkhead 11 includes oppositely facing side walls 12 and 13 and a generally cylindrical interior surface 14 that defines an opening or hole 14a and extends completely through the bulkhead 11 between the walls 12 and 13. The interior surface 14 may alternatively be of other geometric cross sectional shapes. The bulkhead fitting 10 has a longitudinal axis 15 and includes a generally cylindrical fitting body 16 that is received in and extends longitudinally from side wall to side wall through the cylindrical surface 14. The bulkhead fitting 10 further includes a fitting nut 17, a generally cylindrical compression ferrule 18, and a compression nut 19. A tubular fluid conduit 20 is secured to one end of fitting body 16 as described further below. The fitting body 16, fitting nut 17, compression ferrule 18, compression nut 19 and conduit 20 may each be of any suitable metallic or non-metallic material, and in the preferred embodiment each is of a suitable steel material. For other applications for fluid connector bulkhead fitting 10 and/or for other types of bulkhead fittings described above, conduit 20, compression surface 27, fitting nut 17, compression ferrule 18, and compression nut 19 may be omitted and/or replaced with other types of connectors and/or conduits.

The fitting body 16 includes a fluid flow passage 21 that extends longitudinally from end to end through body 16, and in the preferred embodiment the passage 21 is generally cylindrical. Fitting body 16 further includes a head portion 22 and a shank portion 23 that extends longitudinally in both directions from the head portion 22. Head portion 22 has a lateral extent substantially greater than the lateral extent of all portions of both shank portion 23 and interior surface 14 and opening 14*a*. In the preferred embodiment, head portion 22 is a hexagonal wrench receiving head portion. The shank portion 23 includes threaded ends 24 and 25 and generally conical compression faces 26 and 27. Shank portion 23 further includes a reduced diameter relief portion 28 intermediate wrench receiving head portion 22 and threaded end portion 25. The reduced diameter relief portion 28 and the internal surface 14 of bulkhead 11 cooperatively define an annular cavity 29. The threaded ends 24 and 25 have outside thread crest diameters 24*a* and 25*a*, respectively. The thread crest diameters 24*a* and 25*a* may be the same or different. In the preferred embodiment, thread crest diameters 24*a* and 25*a* are equal and are slightly smaller than the lateral extent or diameter of interior surface 14.

As best shown in FIGS. 2 and 3, the shank portion 23 further includes a bulkhead locking portion 30 intermediate hexagonal wrench receiving head portion 22 and threaded portion 25. The bulkhead locking portion 30 includes a tapered locking surface 31 that extends between a minimum size or minimum diameter locking end 31*a* and a maximum size or maximum diameter locking end 31*b*. The minimum size locking end 31*a* is located intermediate the maximum size locking end 31*b* and the threaded portion 25. The lateral extent or diameter of minimum size locking end 31*a* is no greater than, and preferably substantially less than, the major or crest diameter 25*a* of threaded portion 25 (which is the low end of the dimensional tolerance for the crest diameter 25*a*). Further, the lateral extent or diameter of minimum size locking end 31*a* is no greater than, and is preferably substantially less than, the diameter of interior surface 14 and hole 14*a*. The lateral extent or diameter of maximum size locking end 31*b* is substantially greater than the crest diameter 25*a* of threaded portion 25 and is substantially greater than the diameter of interior surface 14 and hole 14*a*. In the preferred embodiment ends 31*a* and 31*b* are generally circular, and tapered portion 31 is generally conical. Tapered or conical locking surface 31 includes circumferentially spaced serrations 32 around its entire circumferential extent. The serrations 32 are circumferentially spaced longitudinally extending grooves formed in the tapered locking surface 31, with generally smooth portions of conical locking surface 31 between adjacent grooves. The tapered locking surface 31 is disposed at an angle 33 in the range of about 5 degrees to about 45 degrees, and preferably about 20 degrees, relative to longitudinal axis 15. The bulkhead locking portion 30 further includes a generally cylindrical locking surface 34 intermediate conical locking surface 31 and wrench receiving head portion 22. The serrations 32 extend longitudinally continuously from conical locking surface 31 into cylindrical locking surface 34 and terminate at a distance 35 longitudinally spaced from head portion 23. The distance 35 provides a generally smooth circumferentially uninterrupted portion of cylindrical locking surface 34 that may assist to prevent displaced material described below from entering between head portion 22 and side wall 12. The serrations 32 may alternatively be of other patterns such as, for example, left-handed or right-handed diagonal or diamond pattern, male or female.

Figure 4:
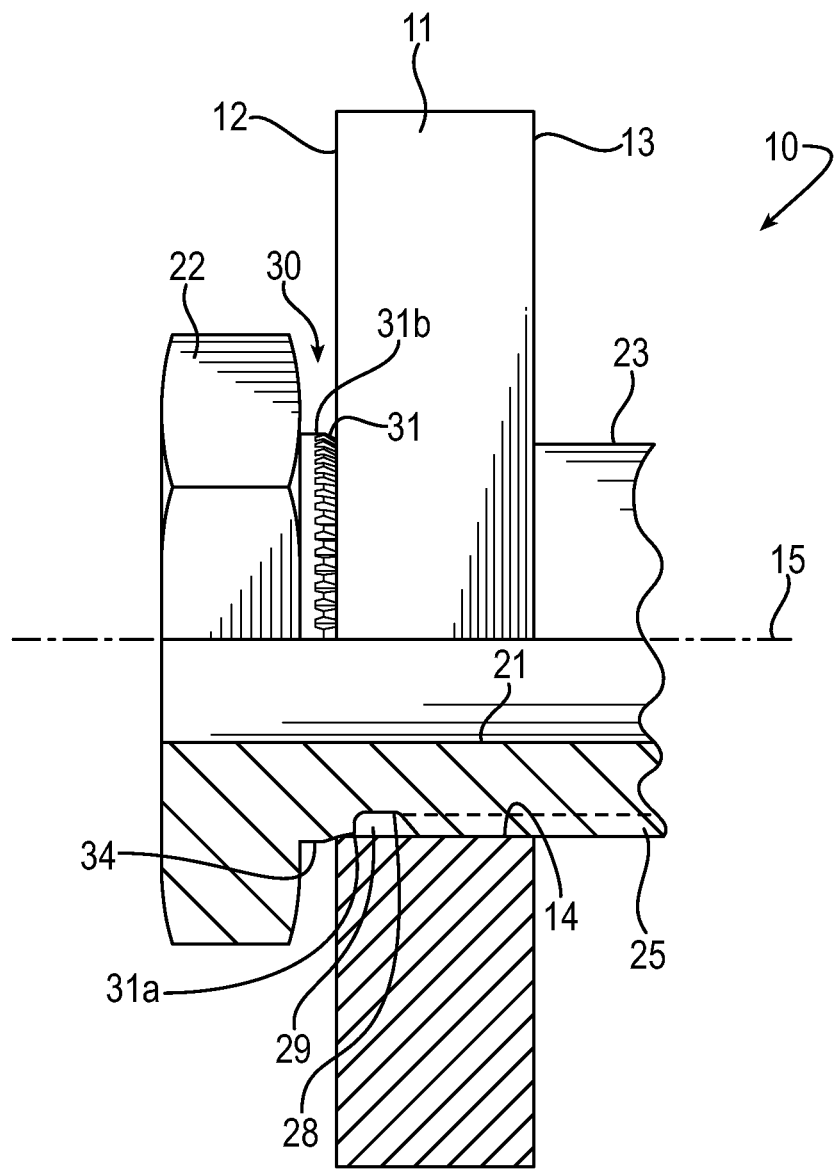
FIG. 4 illustrates a portion of the bulkhead and bulkhead fitting of FIG. 1, showing the top half in elevation and the bottom half in cross section, and showing the bulkhead fitting in a partially assembled configuration.

To assemble bulkhead fitting 10 into bulkhead 11, fitting body 16 without conduit 20 or compression nut 19 or ferrule 18 or fitting nut 17 is inserted from the left as viewed in FIGS. 1-3 into the hole 14*a* in bulkhead 11 defined by interior surface 14. Fitting nut 17 is then threaded to a finger tightened condition onto threaded end 25 of fitting body 16 until nut 17 engages side wall 13 of bulkhead 11. The diameter of interior surface 14 is substantially greater than the diameter of minimum diameter locking end 31 a adjacent reduced diameter relief portion 28, and is substantially smaller than the maximum diameter locking end 31 b adjacent cylindrical locking surface 34 and is also substantially smaller than the diameter of cylindrical locking surface 34, so that a portion of conical locking surface 31 extends into interior surface 14. A wrench (not shown) is then applied to fitting nut 17 to rotate nut 17 against side wall 13 and begin to pull serrated conical locking surface 31 longitudinally into interior surface 14 until a partially assembled position or configuration as illustrated in FIG. 4 is reached. As nut 17 is tightened, the serrations 32 on conical locking surface 31 interact with the annular intersection of interior surface 14 and side wall 12 with an interference press fit to prevent rotation of fitting body 16, so that a separate wrench to hold fitting body 16 against rotation may not be required. Continued application of assembly torque and rotation of nut 17 by application of the wrench on nut 17 then pulls serrated conical locking surface 31 longitudinally further into interior surface 14 and then pulls serrated cylindrical locking surface 34 into interior surface 14 until the fully assembled position illustrated in FIG. 1 (but with ferrule 18 and compression nut 19 and tube 20 not yet assembled onto fitting body 16) is reached. In this configuration, locking portion 30 of bulkhead fitting 10 cooperates with the annular intersection of interior surface 14 and side wall 12 of bulkhead 11 and with interior surface 14 to lock fitting body 16 into bulkhead 11 and prevent rotation or loosening of bulkhead fitting body 16 relative to bulkhead 11 after assembly. If the surface of bulkhead 11 is substantially harder than the surface of locking portion 30, then the material of locking portion 30 may be deformed as conical locking surface 31 and cylindrical locking surface 34 are pulled into interior surface 14. If the surface of bulkhead 11 is substantially softer than the surface of locking portion 30, then the material of bulkhead 11 may be deformed as conical locking surface 31 and cylindrical locking surface 34 are pulled into interior surface 14. If surfaces of bulkhead 11 and locking portion 30 are of about the same hardness, then both may be deformed as this occurs. As this tightening occurs, cylindrical locking surface 34 limits the amount of this deformation, and annular cavity 29 provides a space into which deformed material may be displaced if required, and no deformed material will prevent head portion 22 from directly contacting side wall 12. The longitudinal extent 36 of bulkhead 11 is preferably substantially greater than the combined longitudinal extent 37 of cylindrical surface 34 and conical surface 31, so that substantially the entire longitudinal extent of cylindrical surface 34 and conical surface 31 is locked to bulkhead interior surface 14. In this manner, and as described further below, the bulkhead fitting 10 is locked to bulkhead 11 so that breakaway torque required to rotate the fitting body 16 relative to the bulkhead 11 after assembly of the fitting body 16 onto the bulkhead 11 is significantly greater than the assembly torque.

After fitting body 16 is assembled onto bulkhead 11 in this manner, tube 20, with ferrule 18 and compression nut 19 assembled onto tube 20, is threadably assembled onto fitting body 16 by rotating compression nut 19 onto threaded end portion 25 of fitting body 16 to a finger tight condition. A suitable wrench (not shown) is then applied to the exterior hexagonal wrench receiving surface of compression nut 19 with an applied compression torque to compress the flared end of tube 20 between ferrule 18 and conical end surface 27 to prevent fluid from leaking between tube 20 and fitting 10. In a similar manner, another tube (not shown) which may be substantially the same as or different from tube 20 is assembled with another applied compression torque onto the opposite threaded end 24 of fitting body 16 with another ferrule 18 and compression nut 19 (not shown). If the compression torques applied to the compression nuts 19 to fasten the tubes onto the opposite ends of fitting 10 substantially exceed the wrench assembly torque applied to the fitting nut 17 to fasten the fitting body 16 into the interior surface 14 of bulkhead 11, the engagement of locking surfaces 31 and 34 with interior surface 14 retains fitting body 16 securely in place and prevents breakaway rotation of fitting body 16 relative to bulkhead 11 even with the application of such applied compression torques. Further, after assembly of the fitting 10 onto bulkhead 11 and the assembly of tubes onto opposite ends of fitting body 16, in the event excessive vibration causes nut 17 to loosen from side wall 13 of bulkhead 11, this locking engagement of locking surfaces 31 and 34 with interior surface 14 continues to retain fitting body 16 securely in place and prevents fitting body 16 from loosening relative to bulkhead 11.

Figure 5:
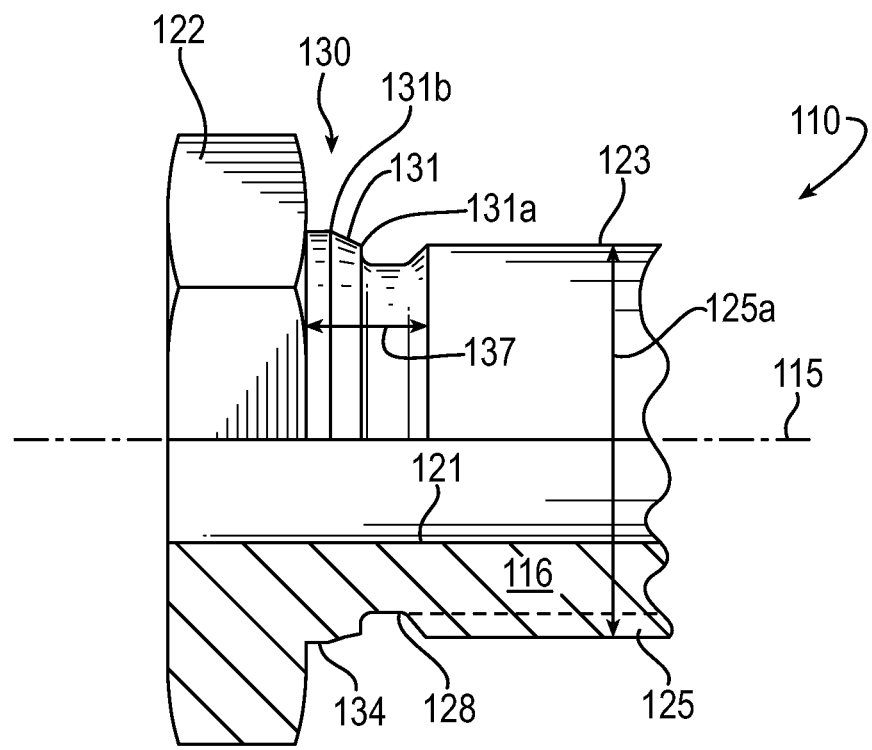
FIG. 5 illustrates a portion of a bulkhead fitting according to a second embodiment of the invention, showing the top half in elevation and the bottom half in cross section.
Figure 6:
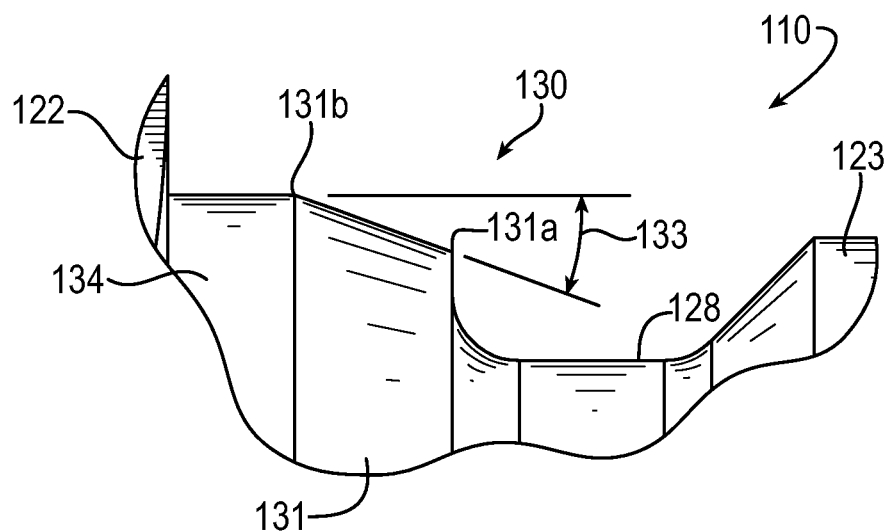
FIG. 6 is an enlarged view of a portion of the bulkhead fitting shown in FIG. 5.

Turning now to FIGS. 5 and 6, a bulkhead fitting 110 according a second embodiment of the invention is illustrated. The bulkhead fitting 110 is used with the bulkhead 11 in substantially the same manner as the bulkhead fitting 10 described above. Identical reference numbers from FIGS. 1-4 are used in FIGS. 5 and 6 with a prefix "1" used in FIGS. 5 and 6, to designate components in FIGS. 5 and 6 having substantially the same structure and operation as described above in connection with FIGS. 1-4 unless otherwise described herein. The substantially conical locking surface 131 and the substantially cylindrical locking surface 134 of the locking portion 130 illustrated in FIGS. 4 and 5 are substantially smooth and do not include the serrations 32 illustrated in FIGS. 1-4 and described above.

Figure 7:
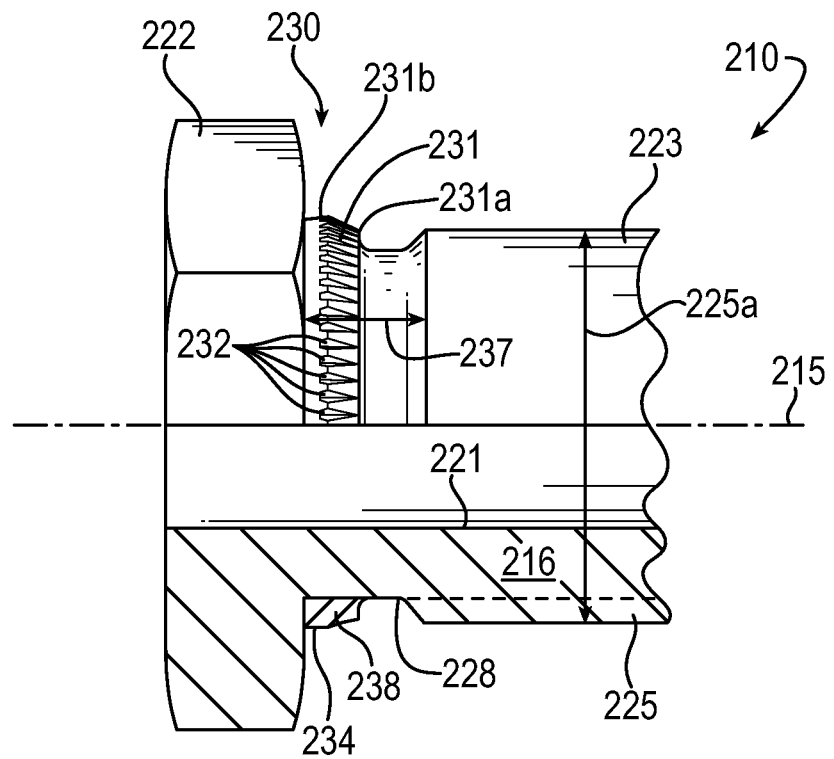
FIG. 7 illustrates a portion of a bulkhead fitting according to a third embodiment of the invention, showing the top half in elevation and the bottom half in cross section.
Figure 8:
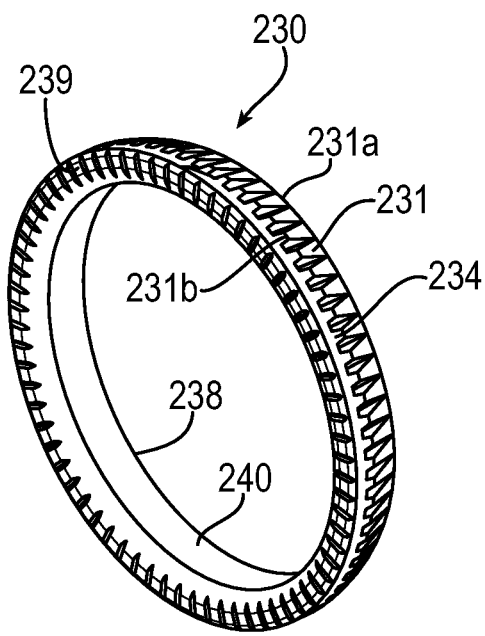
FIG. 8 illustrates a component of the bulkhead fitting illustrated in FIG. 7, with the component shown in perspective view.

Turning now to FIGS. 7 and 8, a bulkhead fitting 210 according a third embodiment of the invention is illustrated. The bulkhead fitting 210 is used with the bulkhead 11 in substantially the same manner as the bulkhead fitting 10 described above. Identical reference numbers from FIGS. 1-4 are used in FIGS. 7 and 8 with a prefix "2" used in FIGS. 7 and 8, to designate components in FIGS. 7 and 8 having substantially the same structure and operation as described above in connection with FIGS. 1-4 unless otherwise described herein. The substantially conical locking surface 231 and the substantially cylindrical locking surface 234 of the locking portion 230 illustrated in FIGS. 7 and 8 are disposed on a separate generally cylindrical ring 238. The ring 238 may be longitudinally split so that it can be temporarily circumferentially expanded to fit over the threaded end 225 to assemble the ring 238 onto the remaining portions of the fitting body 216. This permits the ring 238 and the generally conical locking surface 231 and the generally cylindrical locking surface 234 to be of a different material from that of the remaining portions of the fitting body 216, such as for example, a material with a harder surface. Also, ring 238 includes a longitudinally facing lateral wall 239 with serrations to prevent rotational movement of the remaining portions of fitting body 216 from rotating relative to ring 238 after tightening nut 17 to fully assemble fitting 210 into bulkhead 11. Further, the interior surface 240 of ring 238 and/or the exterior surface of shank 223 laterally immediately adjacent interior surface 240 may be serrated for this purpose.

Figure 9:
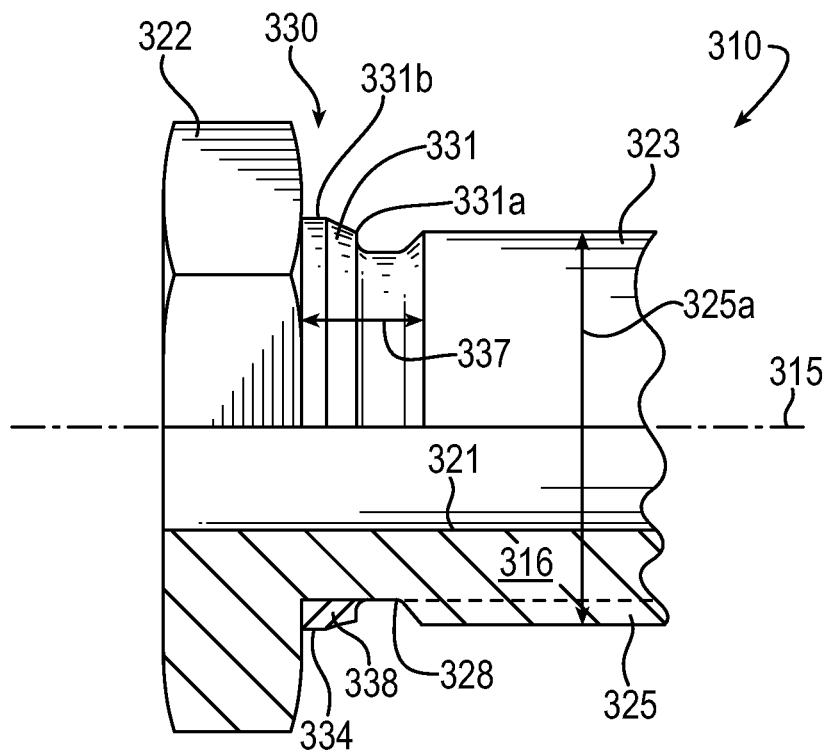
FIG. 9 illustrates a portion of a bulkhead fitting according to a fourth embodiment of the invention, showing the top half in elevation and the bottom half in cross section.
Figure 10:
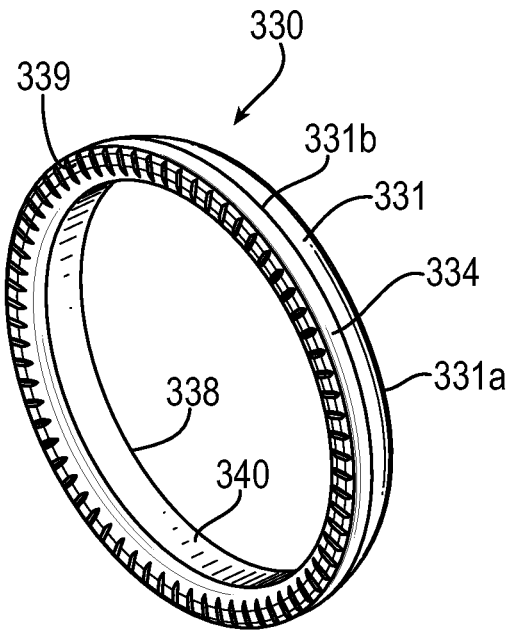
FIG. 10 illustrates a component of the bulkhead fitting illustrated in FIG. 9, with the component shown in perspective view.

Turning now to FIGS. 9 and 10, a bulkhead fitting 310 according a fourth embodiment of the invention is illustrated. The bulkhead fitting 310 is used with the bulkhead 11 in substantially the same manner as the bulkhead fitting 10 described above. Identical reference numbers from FIGS. 1-4 are used in FIGS. 9 and 10 with a prefix "3" used in FIGS. 9 and 10, to designate components in FIGS. 9 and 10 having substantially the same structure and operation as described above in connection with FIGS. 1-4 unless otherwise described herein. The substantially conical locking surface 331 and the substantially cylindrical locking surface 334 of the locking portion 330 illustrated in FIGS. 9 and 10 are disposed on a separate generally cylindrical ring 338. The ring 338 may be longitudinally split so that it can be temporarily circumferentially expanded to fit over the threaded end 325 to assemble the ring 338 onto the remaining portions of the fitting body 316. This permits the ring 338 and the generally conical locking surface 331 and the generally cylindrical locking surface 334 to be of a different material from that of the remaining portions of the fitting body 316, such as for example, a material with a harder surface. Also, ring 338 includes a longitudinally facing wall 339 with serrations to prevent rotational movement of the remaining portions of fitting body 316 from rotating relative to ring 338 after tightening nut 17 to fully assemble fitting 310 into bulkhead 11. Further, the interior surface 340 of ring 338 and/or the exterior surface of shank portion 323 laterally immediately adjacent interior surface 340 may be serrated for this purpose. The substantially conical locking surface 331 and the substantially cylindrical locking surface 134 of the locking portion 330 illustrated in FIGS. 9 and 10 are substantially smooth and do not include the serrations 32 illustrated in FIGS. 1-4 and described above.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A bulkhead fitting comprising a fitting body,
   the fitting body having a head portion for engaging a bulkhead side wall and a shank portion extending longitudinally from the head portion for being received into an opening in a bulkhead, the shank portion having a threaded portion with an outside thread crest diameter of substantially smaller lateral extent than the head portion, wherein the fitting body includes a fluid flow passage extending longitudinally from end to end of the fitting body,
   a bulkhead locking portion substantially adjacent the head portion, the bulkhead locking portion being intermediate the head portion and the threaded portion for locking the fitting body to a bulkhead, the bulkhead locking portion having a tapered locking surface extending between a minimum size locking end and a maximum size locking end, the minimum size locking end being intermediate the threaded portion and the maximum size locking end, the minimum size locking end having a lateral extent no larger than the outside thread crest diameter of the threaded portion, and the maximum size locking end having a lateral extent substantially larger than the outside crest diameter of the threaded portion, the bulkhead locking portion including a generally cylindrical locking surface intermediate the tapered locking surface and the head portion, and the head portion having a wrench receiving outer surface having at least one flat at a radially outer periphery for engagement by a wrench.

2. A bulkhead fitting as set forth in claim 1, wherein the minimum size locking end and the maximum size locking end are each generally cylindrical.

3. A bulkhead fitting as set forth in claim 1, wherein the generally cylindrical locking surface includes serrations.

4. A bulkhead fitting as set forth in claim 3, wherein the serrations on the cylindrical locking surface terminate at a distance longitudinally spaced from the head portion, so that the distance provides a generally smooth cylindrical locking surface.

5. A bulkhead fitting as set forth in claim 1, wherein the tapered locking surface includes serrations.

6. A bulkhead fitting as set forth in claim 5, wherein the serrations of the tapered locking surface extend continuously onto the cylindrical locking surface.

7. A bulkhead fitting as set forth in claim 1, wherein the head portion and the shank portion and the bulkhead locking portion are of integral one piece construction.

8. A bulkhead fitting as set forth in claim 1, wherein the bulkhead locking portion is disposed on a ring carried by the shank portion intermediate the threaded portion and the head portion.

9. In combination, a bulkhead and a bulkhead fitting and a fitting nut, the bulkhead including oppositely facing side walls and a generally cylindrical interior surface defining a hole extending through the bulkhead between the side walls, the interior surface having a hole diameter, the bulkhead fitting including a bulkhead fitting body having a wrench receiving head portion, a shank portion extending longitudinally from the head portion through the hole from one side wall to the other side wall, the shank portion having an external threaded portion with a thread crest outside diameter substantially smaller than the lateral extent of the head portion, the nut being threadably connected to the external threaded portion of the shank portion and engaging the other side wall of the bulkhead, the shank portion having a bulkhead locking portion, the bulkhead locking portion being intermediate the head portion and the threaded portion for locking the fitting body to the bulkhead, the bulkhead locking portion having a tapered locking surface, the tapered locking surface extending between a minimum diameter locking end and a maximum diameter locking end, the minimum diameter locking end being intermediate the maximum diameter locking end and the threaded portion, the diameter of the minimum diameter locking end being substantially less than the hole diameter, the diameter of the maximum diameter locking end being substantially greater than the hole diameter, and the fitting body having a partially assembled configuration and a fully assembled configuration, the tapered locking surface intermediate the minimum diameter locking end and the maximum diameter locking end engaging the bulkhead at the intersection of the one side wall and the interior cylindrical surface when the fitting body is in the partially assembled configuration, the head portion being spaced from the one side wall of the bulkhead when the fitting body is in the partially assembled configuration, the maximum diameter locking surface engaging the bulkhead when the fitting body is in the fully assembled configuration, at least one of the tapered locking surface and the bulkhead interior surface being deformed by the other when the fitting body is in the fully assembled configuration, and the head portion engaging the one side wall when the fitting body is in the fully assembled configuration.

10. A combination as set forth in claim 9, wherein the fitting body includes a reduced diameter relief portion intermediate the minimum diameter locking surface and the threaded portion, and the relief portion and the interior surface defining an annular cavity.

11. A combination as set forth in claim 9, including a fluid flow passage extending longitudinally from end to end through the fitting body.

12. A combination as set forth in claim 9, wherein the bulkhead locking portion includes a generally cylindrical locking surface intermediate the tapered locking portion and the head portion, the generally cylindrical locking surface is longitudinally spaced from the one side wall and from the interior surface when the fitting body portion is in the partially assembled configuration, and the generally cylindrical locking surface being received in the interior surface when the fitting body portion is in the fully assembled configuration.

13. A combination as set forth in claim 12, wherein the generally cylindrical locking surface includes serrations.

14. A combination as set forth in claim 12, wherein the tapered locking surface includes serrations.

15. A combination as set forth in claim 14, wherein the serrations of the tapered locking surface extend continuously onto the cylindrical locking surface, and the serrations on the cylindrical locking surface terminate at a distance longitudinally spaced from the head portion so that the distance provides a generally smooth cylindrical locking surface.

16. A combination as set forth in claim 12, wherein a longitudinal extent of the bulkhead is substantially greater than a combined longitudinal extent of the cylindrical surface and conical surface, so that substantially the entire combined longitudinal extent of the cylindrical surface and conical surface is locked to the bulkhead interior surface.

17. A combination as set forth in claim 9, where the fitting body and the bulkhead locking portion are of integral one piece construction.

18. A combination as set forth in claim 9, wherein the bulkhead locking portion is disposed on a ring carried by the fitting body intermediate the threaded portion and the head portion.

19. A bulkhead fitting comprising a longitudinally extending fitting body disposed along a longitudinal axis, the fitting body having a head portion for engaging a bulkhead side wall and a shank portion extending longitudinally from the head portion for being received into an opening in a bulkhead, the shank portion having a threaded portion with an outside thread crest diameter of substantially smaller lateral extent than the head portion, wherein the fitting body includes a fluid flow passage extending longitudinally from end to end of the fitting body, a bulkhead locking portion substantially adjacent the head portion, the bulkhead locking portion being intermediate the head portion and the threaded portion for locking the fitting body to a bulkhead, the bulkhead locking portion having a tapered locking surface extending between a minimum size locking end and a maximum size locking end, the minimum size locking end being intermediate the threaded portion and the maximum size locking end, the minimum size locking end having a lateral extent no larger than the outside thread crest diameter of the threaded portion, and the maximum size locking end having a lateral extent substantially larger than the outside crest diameter of the threaded portion, the bulkhead locking portion including a generally cylindrical locking surface intermediate the tapered locking surface and the head portion, and the tapered locking surface extending at an angle of about 20 degrees relative to the longitudinal axis.

* * * * *